(12) United States Patent
     Pankow

(10) Patent No.: US 12,693,521 B2
(45) Date of Patent: Jul. 28, 2026

---

(54) AUTOMATIC SLAP IMPACT MITIGATION SYSTEM

(71) Applicant: Baker Hughes Holdings LLC, Houston, TX (US)

(72) Inventor: Matthew Pankow, Skaneateles, NY (US)

(73) Assignee: Baker Hughes Holdings LLC, Houston, TX (US)

( * ) Notice: Subject to any disclaimer, the term of this patent is extended or adjusted under 35 U.S.C. 154(b) by 221 days.

(21) Appl. No.: 18/366,873

(22) Filed: Aug. 8, 2023

(65) Prior Publication Data

US 2025/0052996 A1    Feb. 13, 2025

(51) Int. Cl.
     *G02B 23/24* (2006.01)

(52) U.S. Cl.
     CPC ............................... *G02B 23/2484* (2013.01)

(58) Field of Classification Search
     None
     See application file for complete search history.

(56) References Cited

U.S. PATENT DOCUMENTS

| | | | | | |
|---|---|---|---|---|---|
| 5,018,506 A | * | 5/1991 | Danna | ................... | A61B 1/0053 |
| | | | | | 92/92 |
| 5,019,121 A | * | 5/1991 | Krauter | ................... | A61B 1/008 |
| | | | | | 92/92 |
| 5,203,319 A | * | 4/1993 | Danna | .................... | G02B 23/26 |
| | | | | | 600/152 |

| | | | | | |
|---|---|---|---|---|---|
| 5,345,925 A | * | 9/1994 | Allred, III | ......... | A61M 25/0116 |
| | | | | | 600/114 |
| 5,373,317 A | * | 12/1994 | Salvati | ............... | G02B 23/2476 |
| | | | | | 348/66 |
| 5,982,573 A | * | 11/1999 | Henze | ..................... | G11B 33/08 |
| 5,989,182 A | * | 11/1999 | Hori | ...................... | A61B 1/0052 |
| | | | | | 600/173 |
| 6,761,684 B1 | | 7/2004 | Speier | | |

(Continued)

FOREIGN PATENT DOCUMENTS

| | | |
|---|---|---|
| CN | 105549237 A | 5/2016 |
| CN | 215407493 U | 1/2022 |

(Continued)

OTHER PUBLICATIONS

Deepak et al.; "A Haptic Virtual Borescope for Visual Engine Inspection Training"; IEEE Symposium on 3D User Interfaces; Mar. 9, 2008.

(Continued)

*Primary Examiner* — Thomas A Hollweg

(74) *Attorney, Agent, or Firm* — Mintz, Levin, Cohn, Ferris, Glovsky and Popeo, P.C.

(57) ABSTRACT

An inspection tube of a borescope can include an actuable portion nearer a distal of the inspection tube than a proximal end of the tube. Actuable drive cables can extend a length of the inspection tube to transfer motion to the actuable portion. At a distal end of the inspection tube is an inspection head that can include a motion sensor configured to sense an orientation and a movement of the inspection head. At the proximal end of the inspection tube is a control unit. The control unit can receive a signal from the motion sensor. The signal can be indicative of an orientation and/or the movement of the inspection head. A fall condition can be determined to be occurring based on the signal. The actuable drive cables can then be actuated to move the inspection head to a protected position.

21 Claims, 6 Drawing Sheets

(56) References Cited

U.S. PATENT DOCUMENTS

| | | | | |
|---|---|---|---|---|
| 7,059,182 | B1 * | 6/2006 | Ragner | H04M 1/185 |
| | | | | 73/200 |
| 7,369,345 | B1 * | 5/2008 | Li | G11B 5/5582 |
| | | | | 360/73.03 |
| 7,382,567 | B2 * | 6/2008 | Liao | G01P 15/0891 |
| 7,450,332 | B2 * | 11/2008 | Pasolini | G01P 15/18 |
| | | | | 360/78.04 |
| 7,549,335 | B2 * | 6/2009 | Inoue | G01P 15/0891 |
| | | | | 360/75 |
| 8,903,519 | B2 * | 12/2014 | King | H04M 1/185 |
| | | | | 700/79 |
| 9,538,677 | B2 * | 1/2017 | Coombs | A61B 1/00105 |
| 11,927,546 | B2 * | 3/2024 | Li | G01N 21/954 |
| 12,292,390 | B2 * | 5/2025 | Li | A61B 1/00097 |
| 2006/0236761 | A1 * | 10/2006 | Inoue | G01P 15/0891 |
| 2006/0268447 | A1 * | 11/2006 | Liao | G01P 15/0891 |
| 2009/0225159 | A1 * | 9/2009 | Schneider | A61B 1/00034 |
| | | | | 348/82 |
| 2011/0215940 | A1 * | 9/2011 | Bartholomeyczik | |
| | | | | G01P 15/0891 |
| | | | | 340/669 |
| 2014/0182373 | A1 | 7/2014 | Sbihli et al. | |
| 2014/0268541 | A1 * | 9/2014 | Coombs | A61B 1/00066 |
| | | | | 361/679.41 |
| 2019/0059542 | A1 * | 2/2019 | Mukherjee | A45C 11/00 |
| 2020/0346310 | A1 * | 11/2020 | Huttner | B23Q 9/0007 |
| 2021/0213628 | A1 | 7/2021 | Tang et al. | |
| 2021/0298839 | A1 | 9/2021 | Taylor et al. | |
| 2022/0349834 | A1 * | 11/2022 | Li | G01N 21/954 |
| 2024/0192146 | A1 * | 6/2024 | Li | H04N 23/63 |
| 2025/0116855 | A1 * | 4/2025 | Tang | G02B 23/2476 |

FOREIGN PATENT DOCUMENTS

| | | |
|---|---|---|
| CN | 216351526 U | 4/2022 |
| EP | 4012658 A1 | 6/2022 |
| JP | 2007-151862 A | 6/2007 |

OTHER PUBLICATIONS

International Search Report, mailed Nov. 13, 2024, International Patent Application No. PCT/US2024/040372, filed Jul. 31, 2024.

* cited by examiner

600

Receiving a signal from a motion sensor within
an inspected head of a borescope          602

Determining that a fall condition is occurring
based on the signal          604

Moving the inspection head to a protected position          606

AUTOMATIC SLAP IMPACT MITIGATION SYSTEM

TECHNICAL FIELD

The subject matter described herein relates to borescope systems.

BACKGROUND

Video inspection devices, such as video endoscopes or borescopes, can be used to take depth measurements on an object (e.g., lowest points in anomalies such as pits or dents, heights of welds, measurements of offsets or clearances between surfaces, etc.). Additionally, video inspection devices can be used to observe defects (e.g., tears, cracks, scratches, etc.) on a surface of an object (e.g., an industrial machine). In many instances, the surface of the object is inaccessible and cannot be viewed without the use of the video inspection device. For example, a video inspection device can be used to inspect the surface of a blade of a turbine engine on an aircraft or power generation unit to identify any anomalies to determine if any repair or further maintenance is required. In order to make that assessment, it is often necessary to obtain highly accurate-dimensional measurements of the surface to verify that the anomaly does not fall outside an operational limit or required specification for that object.

SUMMARY

This disclosure relates to a slap impact mitigation system to protect borescope inspection heads.

In some embodiments, a borescope includes an inspection tube. The inspection tube can include an actuable portion nearer a distal of the inspection tube than a proximal end of the tube. Actuable drive cables can extend a length of the inspection tube. The actuable drive cables can be attached to a distal end of the inspection tube. The actuable drive cables are arranged to transfer motion to the actuable portion. At a distal end of the inspection tube is an inspection head that can include a motion sensor configured to sense an orientation and a movement of the inspection head. In some embodiments, the motion sensor can be a three axis accelerometer or a six axis inertial measurement unit with three axis accelerometer and three axis gyroscope. At the proximal end of the inspection tube is a control unit. The control unit can include one or more processors and a non-transient memory with instructions executable by the processor. Such instructions can include receiving a signal from the motion sensor. The signal can be indicative of an orientation and/or the movement of the inspection head. A fall condition can be determined to be occurring based on the signal. The actuable drive cables can then be actuated to move the inspection head to a protected position.

In some embodiments, a travel direction of the inspection head can be determined, by the controller, based on the signal. In some instances, the direction of travel can be in a downward direction. The controller can also determine an actuation length of each drive cable to position the inspection head in a direction substantially the opposite the travel direction. In instances where the travel direction is in a downward direction, the direction substantially opposite the travel direction can be an upward direction. In general, the protected position is facing substantially opposite the travel direction. For example, in some embodiments, the protected position is facing a substantially upward direction.

In some embodiments, actuators can be coupled to proximal ends of the actuable drive cables. The actuators can be configured to move the actuable drive cables responsive to signals received from the control unit. Moving the inspection head can include sending a signal to one or more of the actuators. The actuators can be adjusted responsive to the signal. A drive cable, coupled to an actuator at a first end of the drive cable and to the inspection head at a second end of the drive cable, can be adjusted by the actuator.

In some embodiments, the inspection tube can include a fiber optic cable extending through an inner passage defined by the inspection tube. The fiber optic cable extends between the inspection head and the control unit. Alternatively or in addition, communication cables can extend through the inner passage. The communication cables extend between the inspection head and the control unit.

The inspection head instead can include an electromagnetic sensor, for example, an optical sensor. In embodiments where an optical sensor is used, a lens can be at a distal end of the inspection head and the optical sensor can be arranged to receive light from the lens. In some embodiments, an electromagnetic emitter is arranged to emit electromagnetic radiation in a distal direction. For example, a light source can be arranged to emit light in a substantially distal direction.

BRIEF DESCRIPTION OF THE FIGURES

These and other features will be more readily understood from the following detailed description taken in conjunction with the accompanying drawings.

DETAILED DESCRIPTION

Certain embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting embodiments and that the scope of the present invention is defined solely by the claims. The features illustrated or described in connection with one embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

Figure 1:
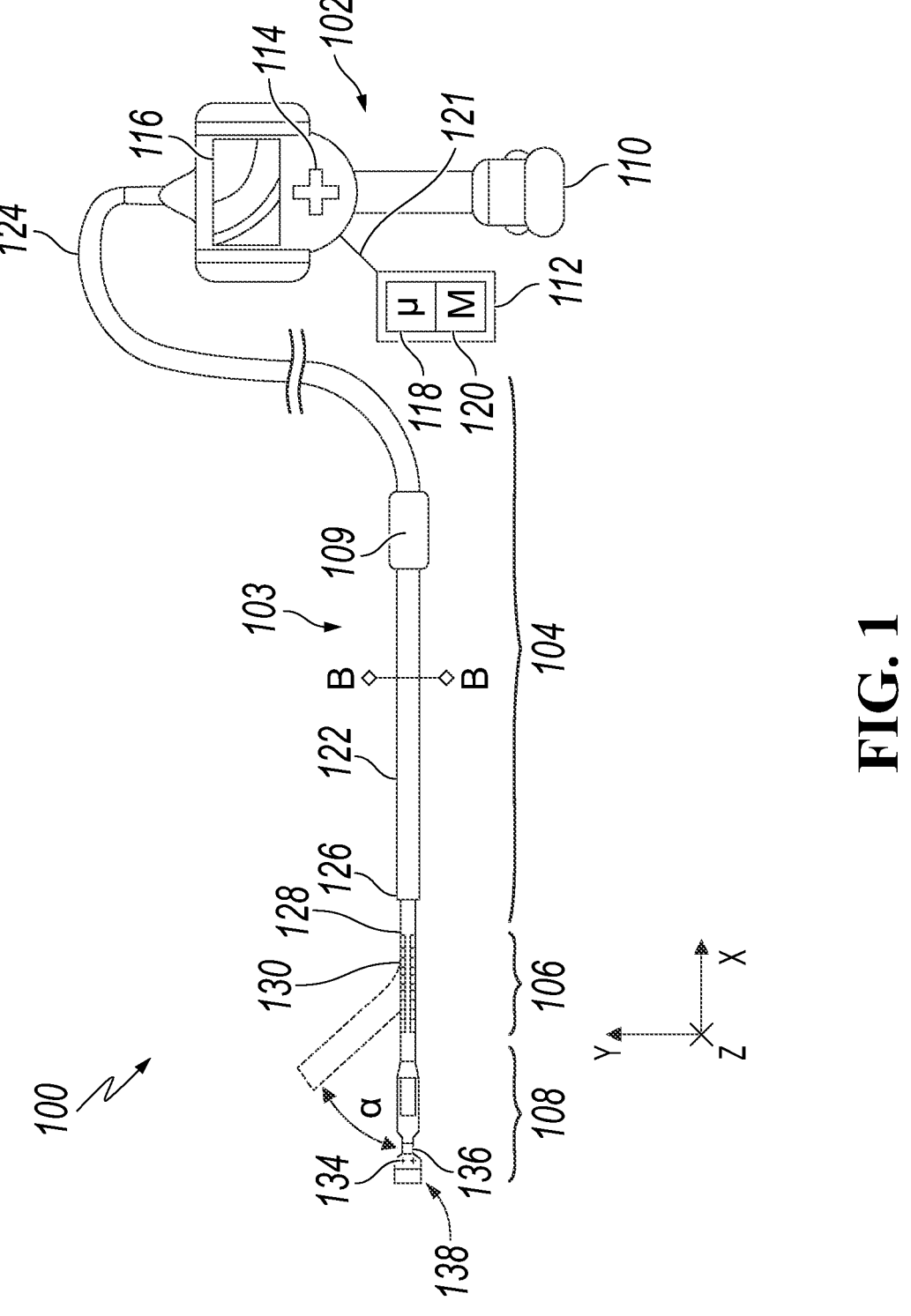
FIG. 1 is a schematic diagram of an example borescope.

FIG. 1 is a diagram illustrating an exemplary embodiment of an inspection device (e.g., a non-destructive device) in the form of a borescope 100. The borescope 100 can include a control unit 102 and an inspection tube 103. The inspection tube 103 can include a conduit section 104, a bendable, actuable articulation portion or section 106, and an inspection head 108. In one embodiment, the sections 104, 106, 108 can have different lengths and can be integral with one another, or can be detachable from one another. As depicted, the conduit section 104 is suitable for insertion into a variety of different targets, such as inside turbomachinery, equipment, pipes, conduits, underwater locations, curves, bends, inside or outside of an aircraft system, and the like.

The borescope 100 can include a probe driver 109 coupled to the conduit section 104. The probe driver 109 can include actuators (not shown) configured to translate and/or rotate one or more of the sections 104, 106, 108 (e.g., to facilitate insertion of the inspection head 108 into the target). Additionally or alternatively, orientation/position of a portion of the inspection head 108 (e.g., camera, light source, etc.) can be varied to acquire an inspection region image (e.g., RGB image, IR image, etc.). The control unit 102 can include a control unit housing 110, a controller 112, a directional input 114, and a screen 116. The controller 112 can include a processor 118 and a readable memory 120 containing computer readable instructions which can be executed by the processor 118 in order to actuate the borescope 100. The computer readable instructions can include an inspection plan based on which the borescope 100 or a portion thereof (e.g., a conduit section 104, a bendable articulation section 106, and an inspection head 108) can be translated/rotated (e.g., by the probe driver 109). In some implementations, the operation of the probe driver 109 can be based on a control signal (e.g., generated by the controller 204 based on the inspection plan/user input via GUI display space on screen 116 or a computing device, etc.).

The controller 112 can be communicatively coupled to the control unit 102 via one or more cables 121. The controller 112 can also be arranged within the control unit housing 110, or can be arranged outside the control unit housing 110. On some implementations, the directional input 114 can be configured to receive user input (e.g., direction controls) to the control unit 102 for actuation of the borescope 100. The screen 116 can display visual information being received by the camera (including an optical sensor) arranged in the inspection head 108, which can allow the user to better guide the borescope 100 using the directional input 114. The directional input 114 and the screen 116 can be communicatively coupled to the controller 112 via the one or more cables 121, which can be a hard-wired connection or a wireless signal, such as WI-FI or Bluetooth. In one implementation, inspection data and/or notifications (e.g., notifications based on inspection data as described above) can be provided on the screen 116. More details on the controller 112 are described later in this disclosure.

The conduit section 104 can include a tubular housing 122 including a proximal end 124 and a distal end 126. The tubular housing 122 can be a flexible member along its whole length, or can be rigid at the proximal end 124 and become more flexible travelling down the length of the conduit section 104 towards the distal end 126. In certain embodiments, the tubular housing 122 can be formed from a non-porous material to prevent contaminants from entering the borescope 100 via the conduit section 104.

The control unit 102 can be arranged at the proximal end 124 of the tubular housing 122, and the bendable articulation section 106 can be arranged at the distal end of the tubular housing 122. The bendable articulation section 106 can include a bendable neck 128 and washers 130. The bendable neck 128 can be arranged at the distal end 126 of the tubular housing 122, and is able to be actuated 360° in the Y-Z plane. The bendable neck 128 can be wrapped in a non-porous material to prevent contaminants from entering the borescope 100 via the bendable articulation section 106.

The inspection head 108 can include a light source 134 (e.g., LEDs or a fiber optic bundle with lights at the proximal end), a camera 136 (or multiple cameras such as visible-light camera, IR camera, etc.), and one or more sensors 138 that can be configured to collect data about the surrounding environment. Details about example sensors 138 are described later within this disclosure. The camera 136 of the borescope 100 can provide images and video suitable for inspection to the screen 116 of the control unit 102. The light source 134 can be used to provide for illumination when the inspection head 108 is disposed in locations having low light or no light. The sensor 138 can record data including temperature data, distance data, clearance data (e.g., distance between a rotating element and a stationary element), flow data, and so on.

In certain embodiments, the borescope 100 includes one or more replacement inspection heads 108. The inspection head 108 can include tips having differing optical characteristics, such as focal length, stereoscopic views, 3-dimensional (3D) phase views, shadow views, etc. Additionally or alternatively, the inspection head 108 can include a removable and replaceable portion of the inspection head 108. Accordingly, the head sections 108, bendable necks 128, and conduit section 104 can be provided at a variety of diameters from approximately one millimeter to ten millimeters or more.

During use, the bendable articulation section 106 and the probe driver 109 can be controlled, for example, by the control inputs (e.g., relative control gestures, physical manipulation device) from the directional input 114 and/or control signals generated by the controller 112. The directional input can be a joystick, D-pad, touch pad, trackball, optical sensor, or a touchscreen over the screen 116. The directional input 114 can also be a similar device that is located outside the control unit housing 110 and connected by wire or wireless means. In particular, a set of control inputs can be used to control the bendable articulation section 106 and/or the probe driver 109. The bendable articulation section 106 can steer or "bend" in various dimensions, while the conduit section 104 can translate and/or rotate, using any combination of actuators and wires arranged within the control unit 102, to adjust the orientation (e.g., a positioning) of the inspection head 108. In some implementations, the control inputs/direction input 114 can be generated by the controller based on an inspection plan.

The actuators can be electric, pneumatic, or ultrasonically operated motors or solenoids, shape alloy, electroactive polymers, dielectric elastomers, polymer muscle material, or other materials. For example, the bendable articulation section 106 and the probe driver 109 can enable movement of the inspection head 108 in an X-Y plane, X-Z plane, and/or Y-Z plane. Indeed, the directional input 114 can be used to perform control actions suitable for disposing the inspection head 108 at a variety of angles, such as the depicted angle α. In this manner, the inspection head 108 can be positioned to visually inspect desired locations.

Once the inspection head 108 is in a desired position, the camera 136 can operate to acquire, for example, a stand-still visual image or a continuous visual image, which can be displayed on the screen 116 of the control unit 102, and can be recorded by the borescope 100. In embodiments, the screen 116 can be multi-touch touch screens using capacitance techniques, resistive techniques, infrared grid techniques, and the like, to detect the touch of a stylus and/or one or more human fingers. Additionally or alternatively, acquired visual images can be transmitted into a separate storage device for later reference.

Figure 2:
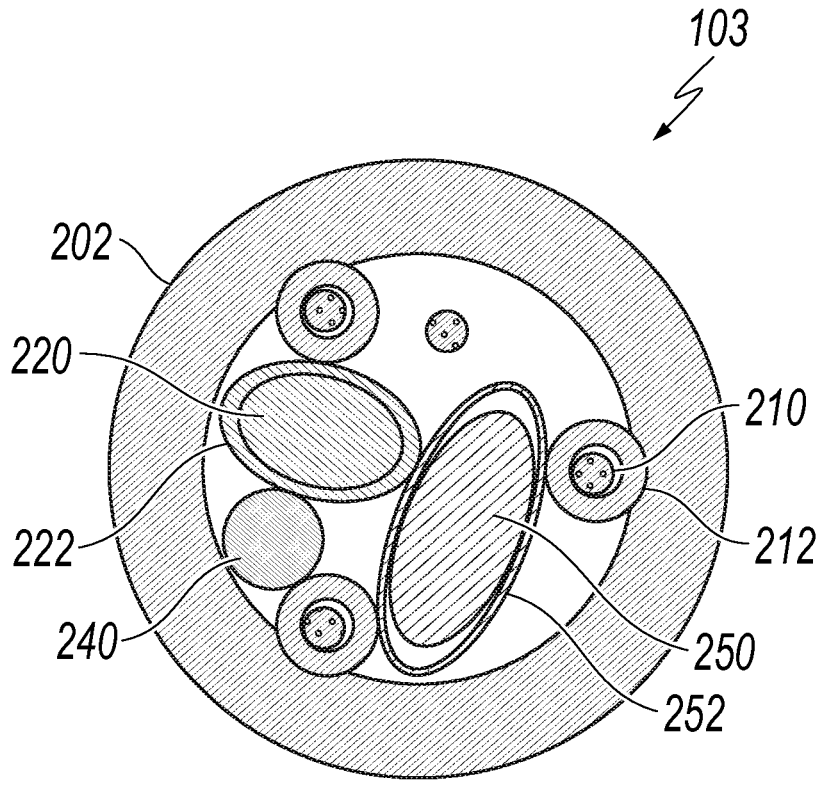
FIG. 2 is a cross sectional view of an inspection tube of the borescope.

FIG. 2 illustrates a cross-sectional view taken along axis B-B of FIG. 1. As shown in FIG. 2, the inspection tube 103 can include a first conduit 202 housing a communication cable 220 having communication cable jacket 222, actuable drive cables 210 for articulating the sensor articulation assembly and having sheaths 212, a phase-measure (PM) contact harness 240, a fiber optic cable 250 having a jacket 252. Each of the communication cable 220, the sheathed actuable drive cables 210, the phase-measure (PM) contact harness 240 and the fiber optic cable 250 can be configured to extend from the borescope control unit 102 through the inspection tube 103 and terminate at the sensing head 108. In some embodiments, the conduit 202 can be made from a stainless steel monocoil, a polyurethane jacket, a tungsten braid, and/or a polyurethane coating.

The communication cable 220 can be configured to connect, for example, a camera in the sensor within the inspection head 108 to the electronics of the control unit 102 in order to produce an image. In some embodiments, the jacket 222 can be made from Teflon.

The sheathed actuable drive cables 210 can be arranged to articulate the articulation section 106. The drive cables 210 can connect the sensing head 108 to a sensing end actuator within the borescope control unit 102. In some embodiments, the actuators within the driver 109 can include one or more cams or reels that the drive cables 210 can be wound around. The driver can be controlled by a controller 112 within the borescope control unit 102. The controller 112 can provide control signals to the sensing end actuator to cause the drive cables 210 to be wound around the cams/reels. By winding the drive cables 210 around their respective cam/reel more or less than others, a user can produce different levels of tension within the actuable section 106 and cause bending of the articulating section 106 in a controlled articulation manner. In some embodiments, the drive cables 210 can be made from tungsten. Additionally, in some embodiments, the cable sheaths 212 can be made from stainless steel.

The fiber optic cable 250 can be configured to transmit information in the form of light, from the sensor 138 on the sensing head 108 to a computing system of the borescope control unit 102. In some embodiments, the fiber optic cable jacket 252 can be made from a PVC or similar material.

Figure 3:
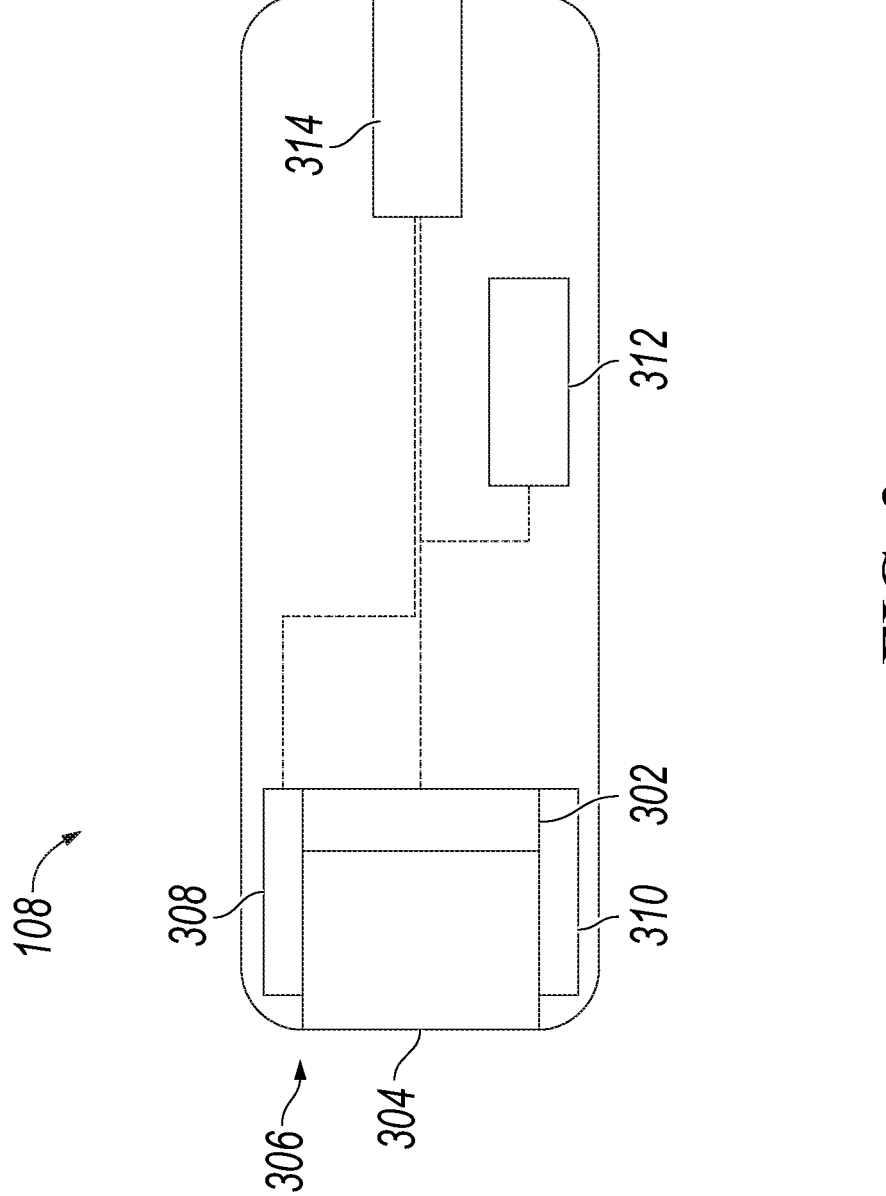
FIG. 3 is a side cross-sectional schematic view of an example inspection head.

A schematic diagram of such an inspection head 108 is illustrated in FIG. 3. All of the sensors described herein can be one of the sensors 138 previously described. The inspection head 108 can include an electromagnetic sensor 302, for example, an optical sensor. In embodiments where an optical sensor is used, a lens 304 can be at a distal end 306 of the inspection head 108 and the optical sensor (electromagnetic sensor 302) can be arranged to receive light from the lens 304. Alternatively or in addition, such an sensor 302 can be housed within the control unit 102 and can be arranged to receive light from the inspection head 108 by the fiber optic cable 250. In some embodiments, an electromagnetic emitter 308 is arranged to emit electromagnetic radiation in a distal direction. For example, a light source can be arranged to emit light in a substantially distal direction.

In some embodiments, a range-finder 310 can be include in the inspection head 108. The range-finder 310 is configured to emit a signal in a distal direction receive a reflected signal back in return. The signal can be optical or acoustic. In some embodiments, the range finder emits multiple signals from the distal end of the inspection head 108. The range-finder 310 can then provide a range signal to the controller 112. By timing the signal returns, a distance of an object from the inspection head 108 can be determined, for example, by the controller 112.

In addition, the inspection head can include a three-axis accelerometer 312. While primarily described as using a three-axis accelerometer 312, other motion sensors can be used without departing from this disclosure, for example, in some embodiments, a six axis inertial measurement unit with three axis accelerometer and three axis gyroscope can be used in lieu of or in addition to the three-axis accelerometer 312. The accelerometer 312 is configured to produce a signal indicative of orientation and/or movement of the inspection head 108. Such a signal can be received and interpreted by the controller 112 to, for example, determine a "true-up" direction to be displayed in the screen 116. Alternatively or in addition, the signal can be received and interpreted by the controller to determine a fall condition is occurring. While primarily described as responding to the determination of a fall condition, the determination of other occurrences, such as impacts, collisions, or other undesired motions, can be used without departing from this disclosure.

The various components within the inspection head 108 are coupled to a communication interface 314. The communication interface 314 connects to the fiber optic cable 250 or the communication cable 220 previously described to facilitate communications between the inspection head 108 and the control unit 102.

Figures 4A, 4B, 4C, 4D, 4E:
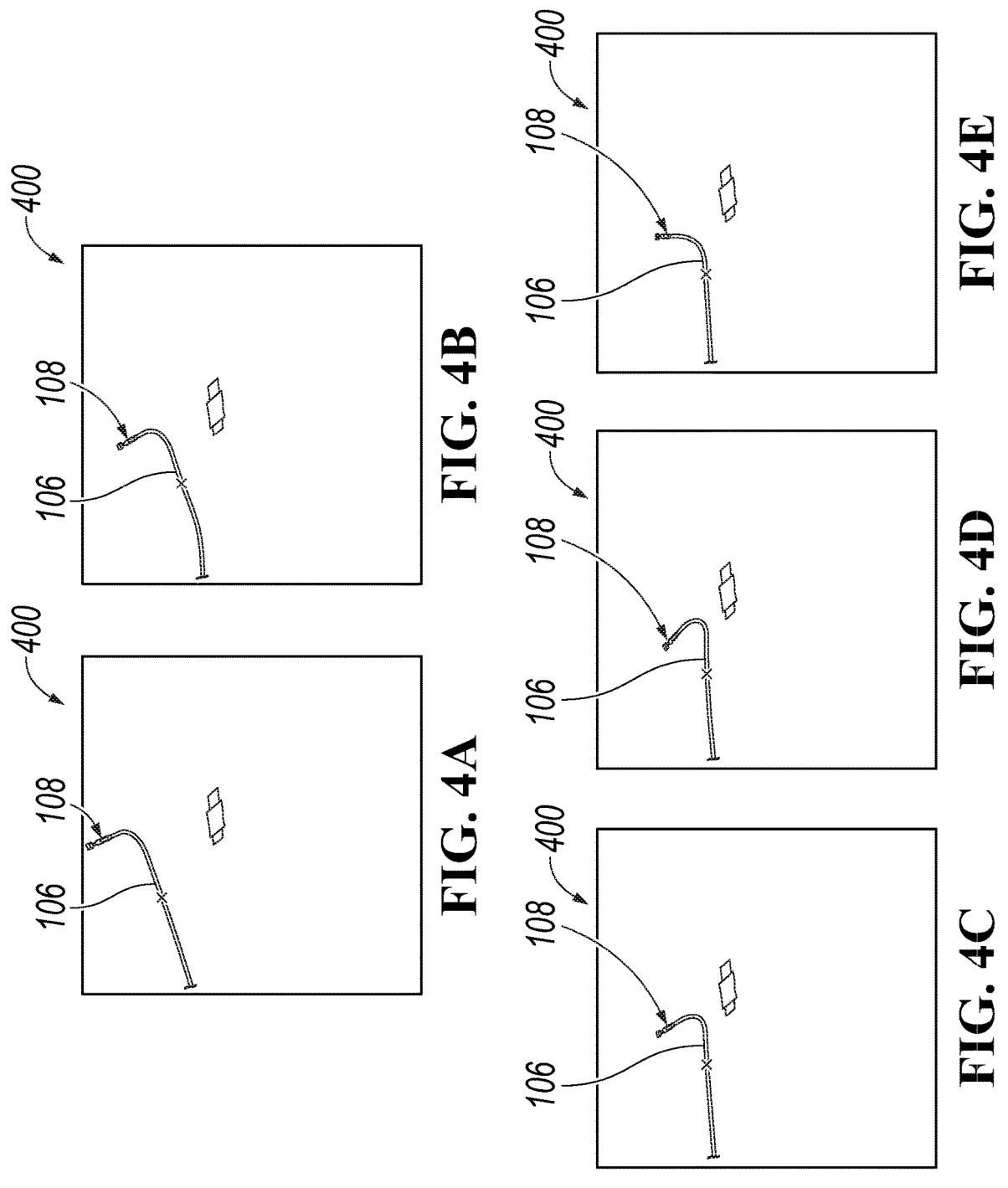
FIGS. 4A-4E illustrate a slap being mitigated during a fall.

In instances where a fall condition occurs, the borescope 100 described herein takes actions to prevent the inspection head from impacting, or slapping, a surface. FIGS. 4A-4E show the borescope 100 reacting a fall condition in sequence. In FIG. 4A, a fall condition is determined to be occurring and the inspection head 108 is moved by the driver 109 in a direction opposite the direction of travel. In the illustrated instance, the opposite direction of travel is in an upward direction as the borescope is falling to the ground 400. It should be noted that the inspection head can be passing in a different direction than down, for example, if the borescope control unit is dropped while the inspection head 108 is within machinery during inspection, the inspection head 108 can be pulled, by the inspection tube 103 coupled to the control unit 102, along a path defined by the inspection tube 103.

FIG. 4B and FIG. 4C illustrate the inspection tube 103 and the bendable section 106 impact the ground in sequence. The inspection head 108 is still in a protected position at this point. FIG. 4D illustrates the bendable section 106 flexing and absorbing energy from the impact, further providing protection to the inspection head 108. Once the energy is absorbed, the inspection head is returned to the protected position, reducing the likelihood of damage due to a surface impact.

Figure 5:
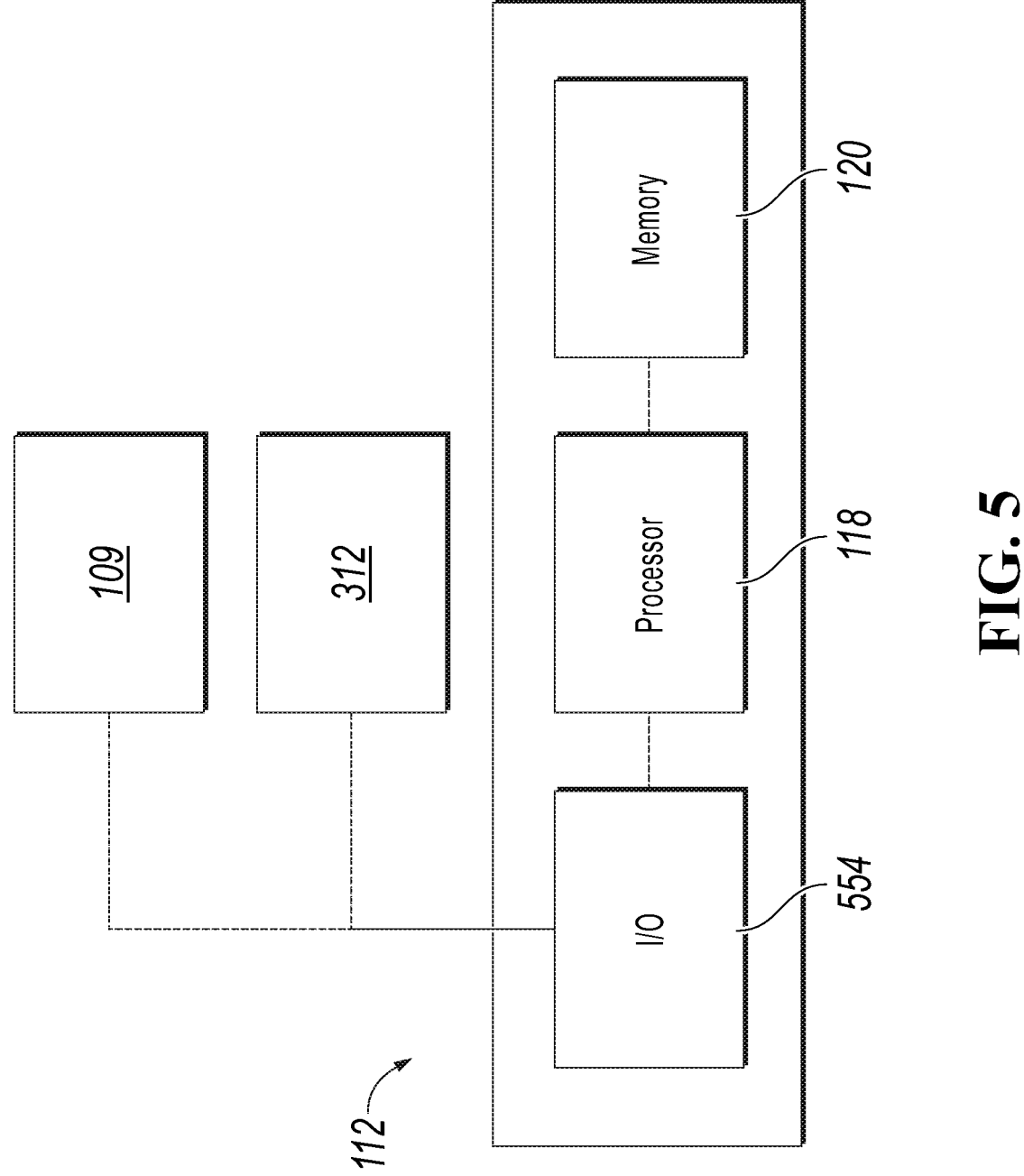
FIG. 5 is a block diagram of an example controller that can be used with aspects of this disclosure.

FIG. 5 illustrates the example controller 112 that can be used with some aspects of the current subject matter. For example, in some embodiments, the controller can execute all or part of the method 600 described later within this disclosure. The controller 112 can, among other things, monitor parameters of a system, send signals to actuate and/or adjust various operating parameters of such systems. As shown in FIG. 5, the controller 112 can include one or more processors 118 and non-transitory computer readable memory storage (e.g., memory 120) containing instructions that cause the processors 118 to perform operations. The processors 118 are coupled to an input/output (I/O) interface 554 for sending and receiving communications with components in the system, including, for example, the driver 109. In certain instances, the controller 112 can additionally communicate status with and send actuation and/or control signals to one or more of the various system components (including, for example, a light source) of the system, as well as other sensors (e.g., pressure sensors, temperature sensors, vibration sensors and other types of sensors) that provide signals to the system.

The controller 112 can be implemented with various levels of autonomy. For example, in some instances, the controller 112 determines a fall condition is occurring, and sends signals to the actuators within the driver 109 to move the inspection head 108 into a protected position with no input from the operator.

Figure 6:
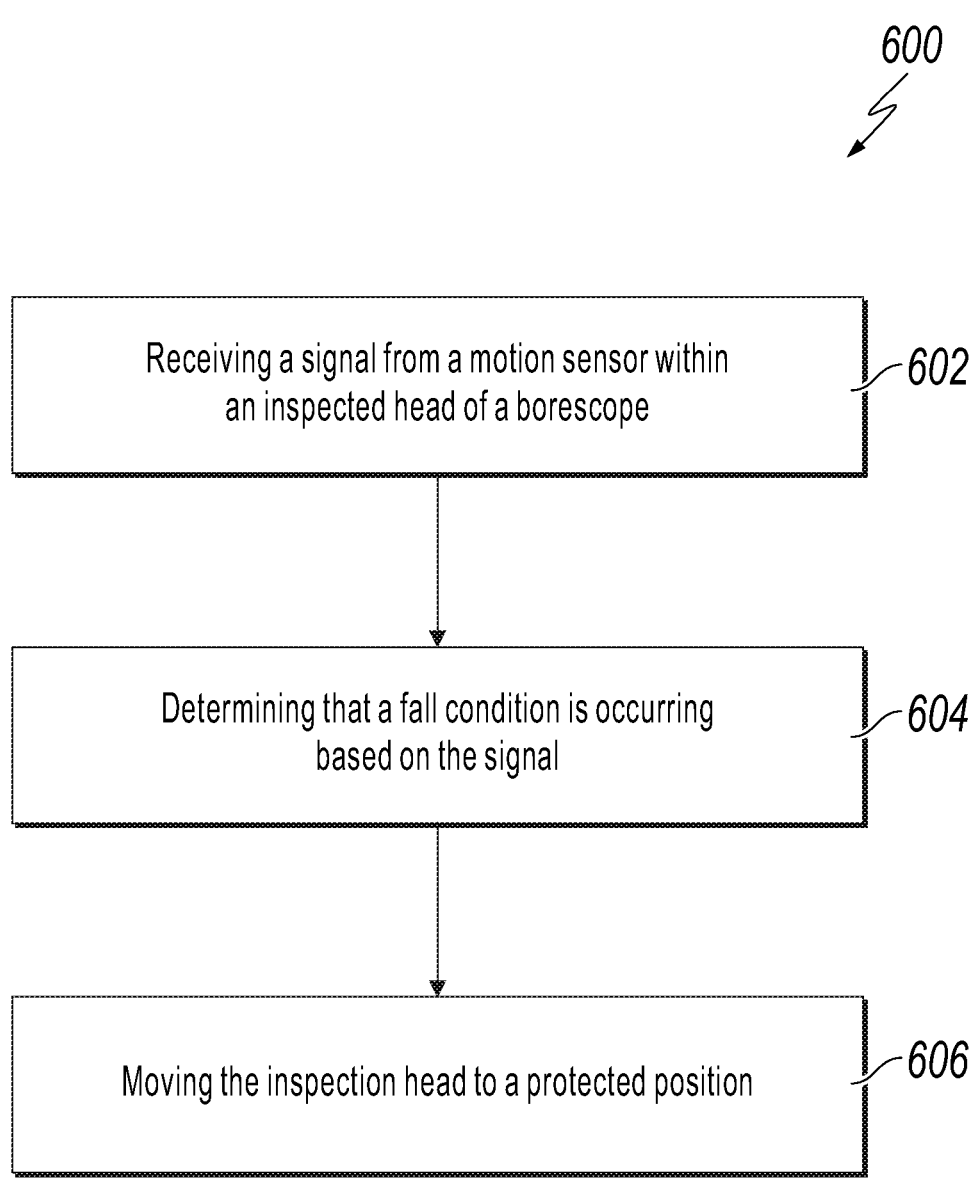
FIG. 6 is a flowchart of a method that can be used with aspects of this disclosure.

The method 600 shown in FIG. 6 can be used with aspects of this disclosure. In some embodiments, all or part of the method 600 can be performed by the controller 112. At 602, a signal from is received from the accelerometer 312 within the inspection head 108 of the borescope 100. The signal is indicative of an orientation and a movement of the inspection head 108.

At 604, that a fall condition is determined to be occurring based on the signal. When such a determination occurs, a direction of travel can then be determined. An actuation stroke length of each drive cable 210 can then be determined to aim the inspection head in a direction substantially the opposite direction of travel. For example, in an upward direction.

At 606, the inspection head 108 is moved to a protected position in response to determining that a fall condition is occurring. Such movement can be done, in some embodiments, by sending a signal to the one or more actuators within the driver 109. The actuators can then be adjusted responsive to the signal. The drive cables 210, coupled to respective actuators within the driver 109 at a first end of each drive cable 210 and to the inspection head 108 at a second end of each drive cable 210, can then be adjusted by the actuators within the driver 109. The result is the inspection head being moved to a protected position facing opposite a direction of travel, for example, in an upward direction in the event of a drop.

While this disclosure contains many specific embodiment details, these should not be construed as limitations on the scope of what may be claimed, but rather as descriptions of features specific to particular embodiments. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments, and it should be understood that the described components and systems can generally be integrated together in a single product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

Other embodiments can be within the scope of the following claims.

What is claimed is:

1. A borescope comprising:
an inspection tube comprising:
    an actuable portion nearer a distal end of the inspection tube than a proximal end of the tube, and
    actuable drive cables extending a length of the inspection tube, the actuable drive cables attached to a distal end of the inspection tube, the actuable drive cables arranged to transfer motion to the actuable portion;
an inspection head attached to the distal end of the inspection tube, the inspection head comprising a motion sensor configured to sense a movement of the inspection head, the inspection head being attached to and movable by the actuable portion; and
a control unit at a proximal end of the inspection tube, the control unit configured to:
    receive a signal from the motion sensor, the signal being indicative of the movement of the inspection head;
    determine a fall condition of the inspection head is occurring based on the signal; and
    actuate the actuable drive cables such that the inspection head is moved to a protected position.

2. The borescope of claim 1, wherein the control unit is further configured to:
    determine an upward direction based on the signal; and
    determine an actuation length of each drive cable to position the inspection head in a substantially upward direction.

3. The borescope of claim 1, wherein the protected position is facing a substantially upward direction.

4. The borescope of claim 1, wherein the control unit is further configured to:
    determine a travel direction of the inspection head based on the signal; and
    determine an actuation length of each drive cable to position the inspection head in a direction substantially the opposite the travel direction.

5. The borescope of claim 4, wherein the protected position is facing substantially opposite the travel direction.

6. The borescope of claim 1, wherein the motion sensor is a three axis accelerometer.

7. The borescope of claim 1, wherein the motion sensor is a six axis inertial measurement unit with three axis accelerometer and three axis gyroscope.

8. The borescope of claim 1, wherein the inspection tube further comprises:

fiber optic cable extending through an inner passage defined by the inspection tube, the fiber optic cable extending between the inspection head and the control unit; and communication cables extending through the inner passage, the communication cables extending between the inspection head and the control unit.

9. The borescope of claim 1, further comprising actuators coupled to proximal ends of the actuable drive cables, the actuators configured to move the actuable drive cables responsive to signals received from the control unit.

10. The borescope of claim 1, wherein the inspection head further comprises:

a lens at a distal end of the inspection head;

an optical sensor arranged to receive light from the lens; and a light source arranged to emit light in a substantially distal direction.

11. A method comprising:

receiving a signal from a motion sensor within an inspection head of a borescope, the signal being indicative of an orientation and a movement of the inspection head;

determining that a fall condition is occurring based on the signal; and moving the inspection head to a protected position in response to determining that a fall condition is occurring.

12. The method of claim 11, wherein moving the inspection head comprises:

sending a signal to one or more actuators;

adjusting the actuators responsive to the signal; and adjusting a drive cable, coupled to an actuator at a first end of the drive cable and to the inspection head at a second end of the drive cable, by the actuator.

13. The method of claim 11, further comprising:

determining a direction of travel; and determining an actuation stroke length of each drive cable to aim the inspection head in a direction substantially the opposite direction of travel.

14. The method of claim 13, wherein moving the inspection head comprises moving the inspection head to face substantially opposite the direction of travel.

15. A borescope comprising:

an inspection tube comprising:

an actuable portion nearer a distal end of the inspection tube than a proximal end of the tube; and actuatable drive cables extending a length of the inspection tube, the actuable drive cables attached to a distal end of the inspection tube, the actuable drive cables arranged to transfer motion to the actuable portion;

an inspection head attached to the distal end of the inspection tube, the inspection head comprising a motion sensor configured to sense a movement of the inspection head, the inspection head being attached to and movable by the actuable portion; and a control unit at a proximal end of the inspection tube, the control unit comprising:

a processor; and a non-transient memory comprising instructions executable by the processor to:

receive a signal from the motion sensor, the signal being indicative of the movement of the inspection head;

determine a fall condition of the inspection head is occurring based on the signal; and actuate the actuable drive cables such that the inspection head is moved to a protected position.

16. The borescope of claim 15, wherein the head comprises;

an electromagnetic sensor; and an electromagnetic emitter arranged to emit electromagnetic radiation in a distal direction.

17. The borescope of claim 15, wherein the inspection tube further comprises:

communication cables extending through an inner passage defined by the inspection tube, the communication cables extending between the inspection head and the control unit.

18. The borescope of claim 15, wherein the memory further comprises instructions executable by the processor to:

determine an upward direction based on the signal; and determine an actuation stroke length of each drive cable to aim the inspection head in a substantially upward direction based on the determined upward direction.

19. The borescope of claim 18, wherein the memory further comprises instructions executable by the processor to:

actuate the actuable drive cables such that the inspection head is moved to face a substantially upward direction.

20. The borescope of claim 15, wherein the memory further comprises instructions executable by the processor to:

determine a direction of travel based on the signal; and determine an actuation length of each drive cable to aim the inspection head in a direction substantially the opposite direction of travel.

21. The borescope of claim 20, wherein the memory further comprises instructions executable by the processor to:

actuate the actuable drive cables such that the inspection head is moved to face substantially opposite the direction of travel.

* * * * *